United States Patent
Hobson

(10) Patent No.: US 11,941,780 B2
(45) Date of Patent: Mar. 26, 2024

(54) MACHINE LEARNING TECHNIQUES TO CREATE HIGHER RESOLUTION COMPRESSED DATA STRUCTURES REPRESENTING TEXTURES FROM LOWER RESOLUTION COMPRESSED DATA STRUCTURES

(71) Applicant: Sony Interactive Entertainment LLC, San Mateo, CA (US)

(72) Inventor: Joshua Scott Hobson, Los Angeles, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 320 days.

(21) Appl. No.: 16/871,796

(22) Filed: May 11, 2020

(65) Prior Publication Data
US 2021/0350503 A1 Nov. 11, 2021

(51) Int. Cl.
*G06T 3/40* (2006.01)
*G06N 3/04* (2023.01)
*G06T 11/00* (2006.01)

(52) U.S. Cl.
CPC ............ *G06T 3/4046* (2013.01); *G06N 3/04* (2013.01); *G06T 11/001* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 10,504,248 B2 | 12/2019 | Fuller et al. | |
| 10,725,438 B1* | 7/2020 | Marsousi | G06K 9/627 |
| 2004/0183948 A1* | 9/2004 | Lai | G06T 3/4007 |
| | | | 348/581 |
| 2013/0004061 A1 | 1/2013 | Sakurai et al. | |
| 2013/0028538 A1* | 1/2013 | Simske | 382/300 |
| 2018/0122127 A1 | 5/2018 | Theis et al. | |
| 2018/0165869 A1 | 6/2018 | Santos et al. | |
| 2019/0304140 A1* | 10/2019 | Fuller | G06T 1/20 |
| 2019/0347771 A1 | 11/2019 | Suszek | |
| 2020/0051287 A1 | 2/2020 | Wihlidal | |
| 2021/0074052 A1* | 3/2021 | Ha | G06T 15/005 |
| 2021/0362061 A1* | 11/2021 | Cai | A63F 13/77 |

OTHER PUBLICATIONS

"Texture Block Compression in Direct3D 11", Microsoft, May 31, 2018, https://docs.microsoft.com/en-us/windows/win32/direct3d11/texture-block-compression-in-direct3d-11.
"The Beginner's Guide to Physically Based Rendering in Unity", Treehouse, Nov. 17, 2015, https://blog.teamtreehouse.com/beginners-guide-physically-based-rendering-unity.

(Continued)

*Primary Examiner* — Aaron M Richer
(74) *Attorney, Agent, or Firm* — John L. Rogitz; John M. Rogitz

(57) ABSTRACT

Machine learning is used to generate a first mipmap of a texture having a first compression based on a second mipmap of the same texture and having a second compression without using compression or decompression in generating the first mipmap. The first mipmap can then be used to render a computer graphics object.

2 Claims, 3 Drawing Sheets

(56) References Cited

OTHER PUBLICATIONS

Hoffman, Naty, "Background: Physics and Math of Shading", Siggraph2012, 2012, https://blog.selfshadow.com/publications/s2012-shading-course/hoffman/s2012_pbs_physics_math_slides.pdf.

Lewis, Tom, "Why you really should be using mipmapping in your graphics applications", Imagination, Aug. 15, 2019, https://www.imgtec.com/blog/why-you-really-should be-using-mipmapping-in-your-graphics-applications/.

Palumbo, Alessio, "An Xbox Game Studio Is Experimenting with Shipping Low-Res Textures to Be AI-Upscaled in Real Time", Feb. 5, 2020, https://wccftech.com/an-xbox-game-studio-is-experimenting-with-shipping-low-res-textures-to-be-ai-upscaled-in-real-time/.

Reed, Nathan, "Understanding BCn Texture Compression Formats", Feb. 12, 2012, http://www.reedbeta.com/blog/understanding-bcn-texture-compression-formats/.

"International Search Report and Written Opinion" dated Aug. 11, 2021, from the counterpart PCT application PCT/US21/30313.

\* cited by examiner

MACHINE LEARNING TECHNIQUES TO CREATE HIGHER RESOLUTION COMPRESSED DATA STRUCTURES REPRESENTING TEXTURES FROM LOWER RESOLUTION COMPRESSED DATA STRUCTURES

FIELD

The present application relates to technically inventive, non-routine solutions that are necessarily rooted in computer technology and that produce concrete technical improvements.

BACKGROUND

In computer simulations such as computer gaming, objects are rendered in part using "texture" data that describes the surfaces of the objects. The more texture data for a given object, the higher resolution the rendering can be. However, for bandwidth purposes it is desirable not to send large texture data structures to a rendering device.

SUMMARY

As understood herein, so-called "mipmaps" (from the Latin multum in parvo) may be used to conserve bandwidth in the following manner. Mipmaps are a sequence of texture data structures, each of which is a progressively reduced resolution representation of preceding texture data structure. Usually this reduction is by a factor of two in each dimension. Bandwidth is conserved by using higher-resolution mipmaps to render objects near the viewer and lower-resolution mipmaps to render objects distant to the viewer. Usually the mipmap level is chosen to be the one that most closely matches the pixel density of the image. Ideally one texture pixel per screen pixel is desired. A texture pixel may also be referred to as a "texel" (combination of texture and pixel).

However, as also understood herein, to conserve memory, texture data is usually compressed into one of a variety of block compression (BCn) modes that are natively sampleable on GPUs. The maximum resolution of a texture is usually limited by storage space constraints and artist authoring time. Using existing machine learning based techniques or other to produce higher resolution images from lower resolution require first decompressing the BCn compressed texture data, upsampling and re-compressing. This is not desirable as it requires extra storage space for uncompressed versions of both the low resolution and high resolution images, and the process for BCn compressing is quite complex and computationally expensive.

Accordingly, an assembly includes at least one processor configured with instructions to receive at least a first data structure representing at least one computer graphic texture. The first data structure has a first resolution. The instructions are executable to process the first data structure using at least one neural network (NN) to generate a second data structure representing the computer graphic texture, with the second data structure having a second resolution higher than the first resolution. The second data structure is thus generated from the first data structure without using compression or decompression. The instructions are executable to use the second data structure for rendering, whether displayed directly to the screen or in intermediate rendering stages.

The computer graphic texture may contain data used for physically based rendering (PBR) materials and may be compressed using block compression (BCn), wherein n is an integer.

In some examples, the first data structure includes an input mipmap and the second data structure includes a mipmap that is one mip level higher than the input mipmap. The input mipmap may include a tail mipmap.

In non-limiting implementations, the first data structure can include at least a first block of normal data and at least a second block of roughness data, and the instructions may be executable to generate the second data structure of at least four blocks of normal data and four blocks of roughness data together.

In non-limiting implementations, the first data structure can include at least a first block of texture data and at least a second block of texture data in proximity to help inform the machine learning, and the instructions may be executable to generate the second data structure of at least four blocks of texture data.

In another aspect, a rendering assembly includes at least one processor configured with instructions executable to receive a first compressed mipmap, and generate a second compressed mipmap from the first compressed mipmap without using compression or decompression of the first compressed mipmap.

In another aspect, a method includes accessing at least one machine learning (ML) engine, and upscaling or downscaling a texture using the ML engine for presentation of an object on a computer display.

The details of the present disclosure, both as to its structure and operation, can be best understood in reference to the accompanying drawings, in which like reference numerals refer to like parts, and in which:

DETAILED DESCRIPTION

Figure 1:
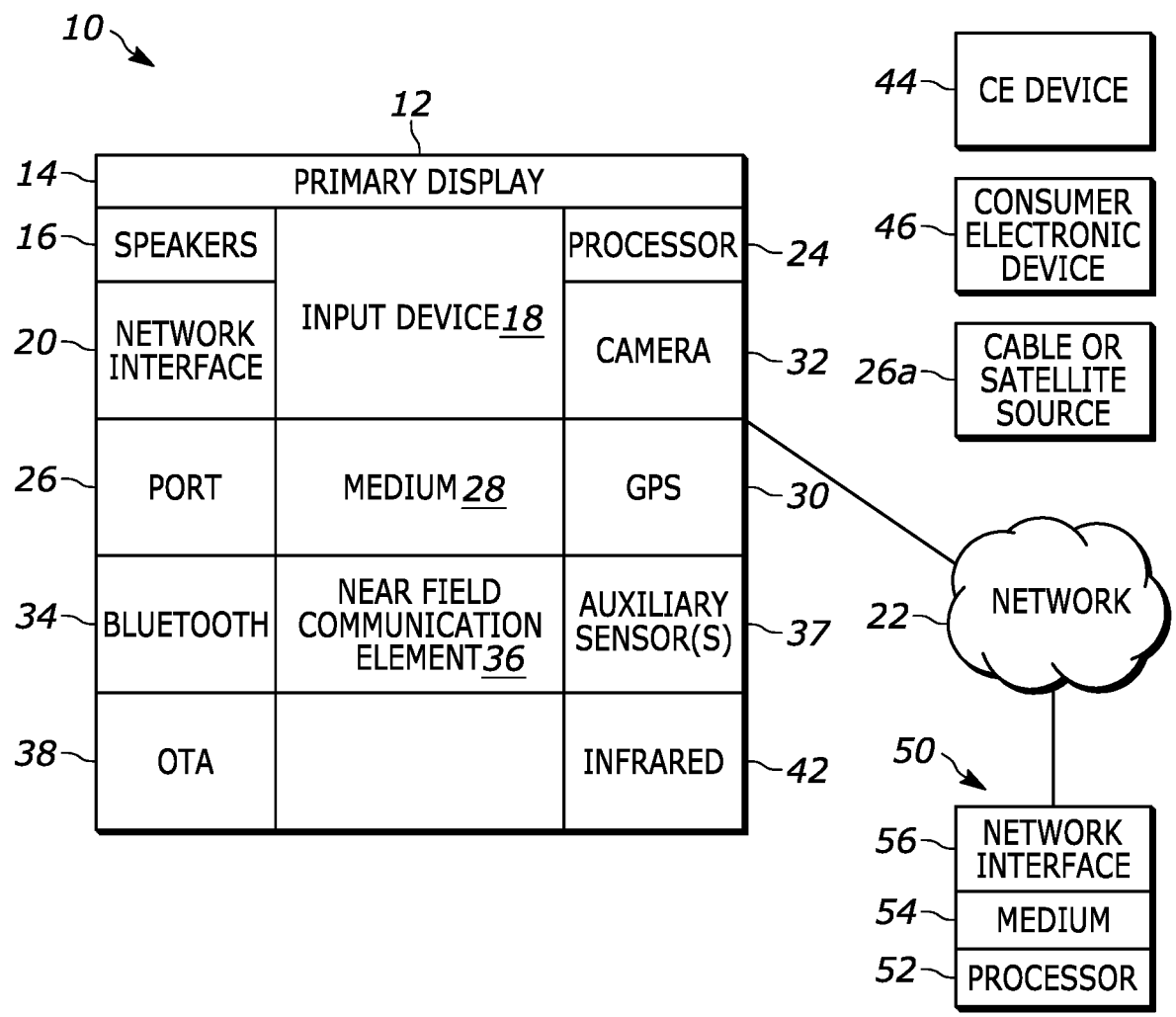
FIG. 1 is a block diagram of an example system including an example in consistent with present principles.

This disclosure relates generally to computer ecosystems including aspects of consumer electronics (CE) device-based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft or Unix or Apple, Inc. or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers. A processor may be implemented by or may include one or more graphics processing units (GPU).

Software modules described by way of the flow charts and user interfaces herein can include various sub-routines, procedures, etc. Without limiting the disclosure, logic stated to be executed by a particular module can be redistributed to other software modules and/or combined together in a single module and/ or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java®, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as, e.g., a computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as a keyboard or keypad or an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid-state storage (including but not limited to flash memory). Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to send messages to a second CE device 46 may include similar components as the first CE device 44 and hence will not be discussed in detail. In the example shown, only two CE devices 44, 46 are shown, it being understood that fewer or greater devices may be used.

The example non-limiting first CE device 44 may be established by any one of the above-mentioned devices, for example, a portable wireless laptop computer or tablet computer or notebook computer or mobile telephone, and accordingly may have one or more of the components described below. The second CE device 46 without limitation may be established by a wireless telephone. The second CE device 46 may implement a portable hand-held remote control (RC). The second CE device 46 may implement virtual reality (VR) and/or augmented reality (AR) a head-mounted display (HMD). The CE devices 44, 46 may include some or all of the components illustrated in the case of the AVDD 12.

At least one server 50 may include at least one server processor 52, at least one computer memory 54 such as disk-based or solid-state storage, and at least one network interface 56 that, under control of the server processor 52, allows for communication with the other devices of FIG. 1 over the network 22, and indeed may facilitate communication between servers and client devices in accordance with present principles. Note that the network interface 56 may be, e.g., a wired or wireless modem or router, Wi-Fi transceiver, or other appropriate interface such as, e.g., a wireless telephony transceiver.

Accordingly, in some embodiments the server 50 may be an Internet server and may include and perform "cloud" functions such that the devices of the system 10 may access a "cloud" environment via the server 50 in example embodiments. Or, the server 50 may be implemented by a game console or other computer in the same room as the other devices shown in FIG. 1 or nearby.

Devices discussed herein may include some or all, as appropriate, of the various components shown in FIG. 1.

Figure 2:
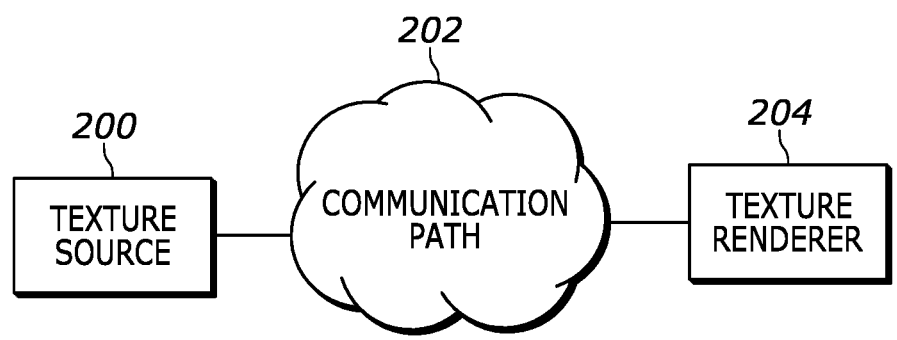
FIG. 2 illustrates an example texture communication path.

Prior to turning to FIG. 2, "textures" are data structures that can be mapped onto images to characterize the surfaces of the rendered objects. The basic data element of a texture data structure is a texture element or texel (combination of texture and pixel). Textures are represented by arrays of texels representing the texture space. The texels are mapped to pixels in an image to be rendered to define the rendered surface of the image.

Thus, textures are data and not images and so neural network (NN) training below does not necessarily rely on perceptual error principles. An exception may be made for albedo (discussed further below) but in general texture data training uses an error metric specific to the purpose of the particular data.

Some types of data such as normal and roughness can be paired together because the two can absorb each other's error since they're interrelated. With greater specificity, in PBR rendering a relationship exists between normal map data and roughness data (sometimes referred to as gloss data). Roughness describes essentially the variance of normals across a texture pixel. As such, techniques exist to modify roughness to account for data lost when reducing the resolution of normal maps when generating mipmaps, essentially anti-aliasing the normal map. In this case there is a tight association between a normal map and the corresponding roughness map.

With additional detail on textures, physically based rendering (PBR) and materials is a general set of guiding principles for render realistic material and light interaction which involves using various types of data stored in textures. Light is modeled as either diffuse or specular. Diffuse lighting is generally view-independent and generally does not change not matter want angle the material is viewed from. Specular lighting, on the other hand, is view-dependent to emulate, e.g., glare.

Generally PBR textures include the parameter of "albedo", which characterizes the diffuse lighting response of a material. For example, for an emulated surface of polished wood, the albedo texture contains the wood grain pattern and color changes but no shape information, very flat. Metals have no albedo as all of their lighting response comes from specular.

As mentioned above, PBR textures also may include the parameter of "normal". A normal map defines the small shape detail for the surface, specifically representing the surface normal of the underlying surface. This may or may not be decoupled from the geometric normal of triangle data used in rendering. This is vector data stored as a texture, and while it can be viewed it is not an image per se. In the wood example this might be mostly flat where the wood is smooth but contain detail for etching or carving in the wood surface.

As is also mentioned above, PBR textures also may include the parameter of Gloss/Roughness, which defines how rough the surface to be rendered is. Generally this is considered to be variance of sub-pixel normal data (detail smaller than a texel in the normal map). In the wood example this might contain data about scuffs in the wood (imagine scrubbing the wood with sand paper) in the case of polished wood it would be relatively smooth and thus the roughness would be low.

Another PBR parameter is Reflectance, representing the specular lighting response. For most non-metal materials reflectance has no color. Reflectance for nearly all non-metals is a constant 2% (how much light is directly reflected). For a mirror, reflectance approaches 100%.

Some PBR techniques attempt to exploit the fact that non-metals have a constant reflectance and that metals have no albedo. This usually involves repurposing the albedo texels where a surface is metal to instead represent the reflectance (with color, gold, brass etc.) and storing extra information in other another texture channel to identify which texels are metal and not. Generally this information is referred to as "metalness". This encoding is generally done to save texture memory by not storing three channels for albedo and another three channels for reflectance.

In general textures can have varying purposes and can differ from game engine to game engine.

With the above discussion of textures in mind, multiple versions of the same texture typically are generated, of varying compression (and, hence, or varying resolution). Specifically, a single texture may be represented by a full mipmapped chain of textures. Mipmapping takes an image and reduces the resolution by a factor of two successively. Thus, for any given texture, e.g., 1024×1024, there is also stored in memory a 512×512 version of it and a 256×256 version of it and so on. This enhances performance, visual fidelity, and facilitates texture streaming. Texture streaming attempts to conserve memory by only loading the necessary mipmap "tail" (a lower miplevel and all the lower resolution miplevels below it) for a given texture based on the rendered objects' size of screen. For example a 256×256 mip level and lower of a 1024×1024 texture's mip chain may be all that is needed to be loaded for an object that is far away. Which mip levels are loaded changes on-demand based on the changing game environment and viewer position. As objects get closer, higher resolution mip levels or "levels of detail" are loaded into memory for rendering the now-closer objects.

Various types of compression may be used on textures. One type is block compression, sometimes expressed as BCn compression that is a lossy texture compression which can be decompressed in-place by graphics processing units (GPUs). Block compression does not require the whole image to be decompressed, so the GPU can decompress the data structure while sampling the texture as though it wasn't compressed at all.

Block compression techniques compress 4×4 blocks of pixels into a single (smaller) data packet. Generally this involves selecting two or more (depending on the BC compression type) "endpoint" colors with some information per-pixel about how to blend between those two colors at each pixel. The endpoint colors are shared for the entire 4×4 pixel block. For instance, for an image of only red, blue and purple pixels, the compressor would likely choose one end point to be red, and the other blue. The purple pixels would have values that blend the two together.

The different BC types mostly differ in how many texture channels they have (BC4 for instance is one channel gray-scale, "black and white"). BC6 and BC7 are special because they introduce the concept of modes that decide the interpretation of each block. For the other BC modes all blocks are encoded the same way, with the same number of bits allocated for endpoint colors and blend values. With BC6/7 different modes allocate their bits differently on a per-block basis which allows the compressor to make different quality trade-offs in different regions of a texture.

FIG. 2 illustrates a texture source 200 that sends textures for rendering in accordance with principles above via a communication path 202 such as a local data bus or wired/wireless network link to a texture renderer 204, which typically includes one or more GPUs with memories to render images in accordance with image data and texture data on a display.

Figure 3:
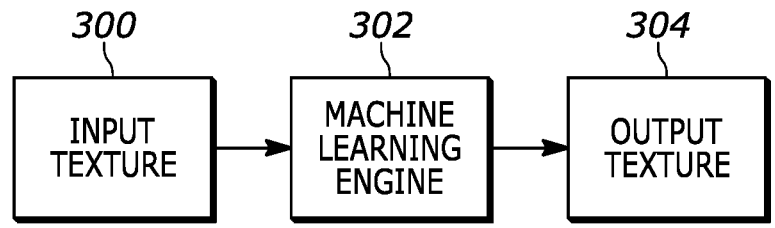
FIG. 3 illustrates example components of a PBR material.

FIG. 3 shows that in embodiments herein, only a tail texture 300 need be sent from the source 200 to the renderer 204, which can execute a machine learning engine 302 on the texture to up-scale it to a texture 304 with the next highest level of resolution without the need for decoding/encoding and, hence, without the need for a codec. The machine learning engine 302 may include one or more trained neural networks such as generative, noise-based, possibly adversarial networks.

Thus, machine learning is used to generate a mipmap of a texture that is one level higher than an input mipmap (for instance, from a mipmap chain authored on disk) for all streamed textures. The new (higher resolution) mipmap may be introduced similarly as if it existed on the disk, just generated procedurally instead. Since the textures can be stored on disk in BCN compressed formats, the network generates a new compressed mip level from the highest existing compressed mip level in memory. If the cost of generating the mip levels at run time is too high, mip levels can be generated offline and stored on disk using the same method.

Figure 4:
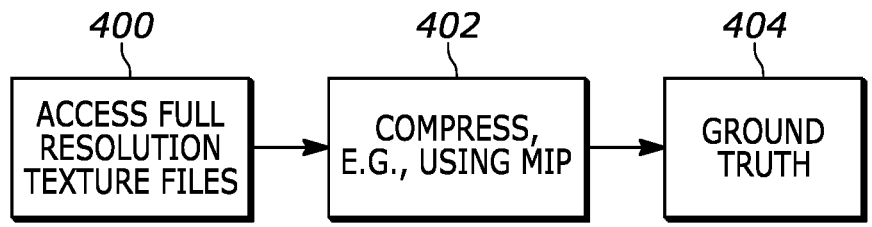
FIG. 4 illustrates example logic in example flow chart format for providing ground truth training data.

FIG. 4 illustrates example training principles for the machine learning engine 302 in FIG. 3. An existing texture library may be accessed at block 400 for ground truth training and compressed at block 402 to establish the next mip level down (again half by half). In other words, full, uncompressed (and thus highest resolution) mipmaps may be accessed at block 400 and compressed by one-half at block 402 to render a compressed (and thus lower resolution) mipmap. The mipmaps generated at block 402 may be successively compressed according to principles herein to render a full set of mipmaps for each input non-compressed mipmap, rendering ground truth at block 404.

Figure 5:
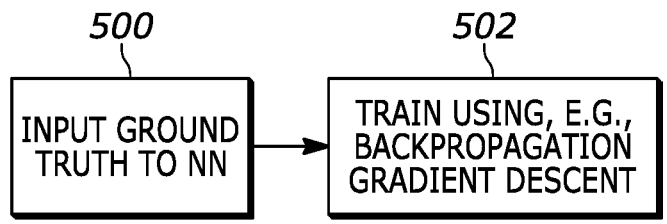
FIG. 5 illustrates example logic in example flow chart format for training a texture-rendering machine learning engine.

FIG. 5 illustrates that a simple network may access at block 500 one compressed BC block data packet from the ground truth set and generate at block 502 four BC block data packets for the higher mip level, effectively going from, e.g., a 4×4 block of pixels to 8×8 block of pixels. Alternatively, instead of or in addition to taking in one BC block as input, a neighborhood of blocks surrounding the block (e.g., eight surrounding blocks) may also be provided as input, to better inform the network of features.

Training may be implemented using backpropagation, gradient descent. Training may be executed using 80/20 train test split in which 80 percent random sample of the ground truth data is used to train or set the weights in the NN, then the additional 20 percent of test data downscaled files are input and compared to what the NN generated. In other words, the output of the NN can be compared against the ground truth 20 percent full resolution files that were not input during training session.

Because there are principally different types of data between the different material attribute textures, different networks may be trained for each material attribute type. For example, one network may be trained for upscaling reflectance texture data and another network may be trained for upscaling albedo.

In the case of normal and roughness, which store similar data and therefore have some cross relationships, a single network may be trained to upscale them together. The same consideration may apply to other related pairs or groups of material attributes. In the case of a shared normal and roughness up-res network, one BC block with normal data and one BC block of roughness data at the same associated location may be input, and the network may output four BC blocks of normal data and four BC blocks of roughness data.

Figure 6:
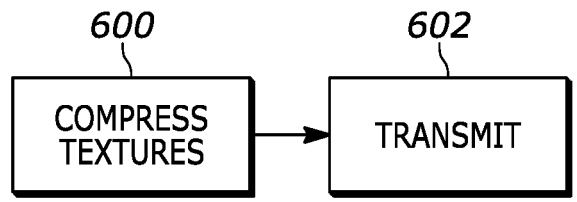
FIG. 6 illustrates example logic in example flow chart format for providing textures to a renderer.

FIG. 6 illustrates that textures may be compressed at block 600 and sent to the renderer at block 602. In one example the lowest resolution (most highly compressed) "tail" textures in mipmap chains are sent to the renderer, which can upscale them on the fly using the trained machine learning engine described herein without the need for a codec. In other embodiments a relatively little-compressed, high resolution texture (or the uncompressed base texture itself) may be provided as input to the renderer, which can generate, using machine learning, more-compressed, less resolution textures.

Figure 7:
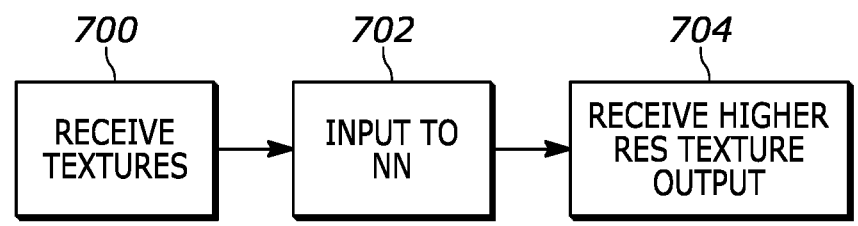
FIG. 7 illustrates example logic in example flow chart format for upscaling input textures using the machine learning engine.

FIG. 7 illustrates the renderer logic. The input textures are received at state 700. The textures are processed through the trained machine learning engine at block 702 to output differently compressed textures at block 704, either more-compressed (lower resolution) or less-compressed (higher resolution) than the input textures. The textures at block 704 are used to render images on a display.

Figure 8:
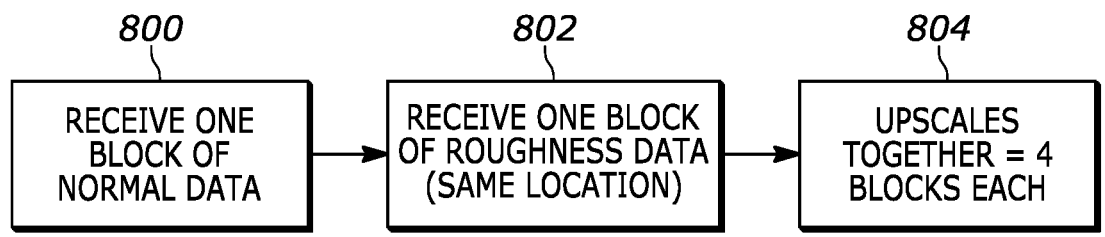
FIG. 8 illustrates example logic in example flow chart format for upscaling two texture data types together.

FIG. 8 illustrates that in the case of a shared normal and roughness up-res network, one BC block with normal data is received by the machine learning engine at block 800 and one BC block of roughness data at the same associated location is received at block 802. At block 804 the machine learning engine upscales the two input blocks together to output four BC blocks of normal data and four BC blocks of roughness data.

While particular techniques are herein shown and described in detail, it is to be understood that the subject matter which is encompassed by the present application is limited only by the claims.

What is claimed is:

1. An assembly comprising:
at least one processor configured with instructions to:
receive at least a first data structure representing at least one computer graphic texture, the first data structure having a first resolution;
process the first data structure using at least one neural network (NN) to generate a second data structure representing the computer graphic texture, the second data structure having a second resolution different from the first resolution; and
use the second data structure to render an object on at least one display, wherein the first resolution is higher than the second resolution.

2. An assembly comprising:
at least one processor configured with instructions executable to:
receive a first mipmap; and
generate a second mipmap from the first mipmap wherein the first mipmap is characterized by a first resolution and the second mipmap is characterized by a second resolution, and the first resolution is higher than the second resolution.

* * * * *